United States Patent [19]

VerBurg

[11] 4,036,997

[45] July 19, 1977

[54] METHOD FOR FREEZE FORMING MEAT PRODUCTS

[76] Inventor: David L. VerBurg, 4069 Lila Ave., Grandville, Mich. 49418

[21] Appl. No.: 588,591

[22] Filed: June 20, 1975

Related U.S. Application Data

[62] Division of Ser. No. 431,678, Jan. 9, 1974, Pat. No. 3,924,295.

[51] Int. Cl.² .............................................. A23L 1/31
[52] U.S. Cl. .................. 426/272; 426/641; 426/513; 426/524
[58] Field of Search ............... 426/272, 513, 524, 645, 426/641, 646

[56] References Cited

U.S. PATENT DOCUMENTS

| | | | |
|---|---|---|---|
| 1,864,285 | 6/1932 | Taylor | 426/272 X |
| 2,298,159 | 10/1942 | Plitt et al. | 426/272 |
| 3,075,843 | 1/1963 | Maas et al. | 426/272 |
| 3,076,713 | 2/1963 | Maas | 426/641 X |
| 3,285,753 | 11/1966 | Schwall et al. | 426/272 |
| 3,567,464 | 3/1971 | Stallons | 426/272 |
| 3,573,062 | 3/1971 | Paynter et al. | 426/641 X |

Primary Examiner—Raymond N. Jones
Assistant Examiner—Esther L. Massung
Attorney, Agent, or Firm—Price, Heneveld, Huizenga & Cooper

[57] ABSTRACT

Method and apparatus for forming shaped meat products capable of withstanding subsequent cooking without loss of geometric integrity. Chunks of uncooked animal meat, after mechanical working to cause a tacky exudate to form on the surface of the meat, are packed in a closed mold structure and frozen to cause expansion of the meat within the closed mold. Pressure developed entirely by expansion of freezing forces the meat chunks to fill any voids within the mold and to press the meat chunks tightly together to form an integral block or loaf of meat conforming to the shape of the mold. To control the pressure within the mold, a portion of the mold is closed by a resiliently biased member capable of resisting movement of the member in response to internal pressures up to a predetermined range which are generated by expansion of the meat. When removed from the mold the meat may be cut and prepared in any desired conventional manner without loss of its geometric integrity.

14 Claims, 7 Drawing Figures

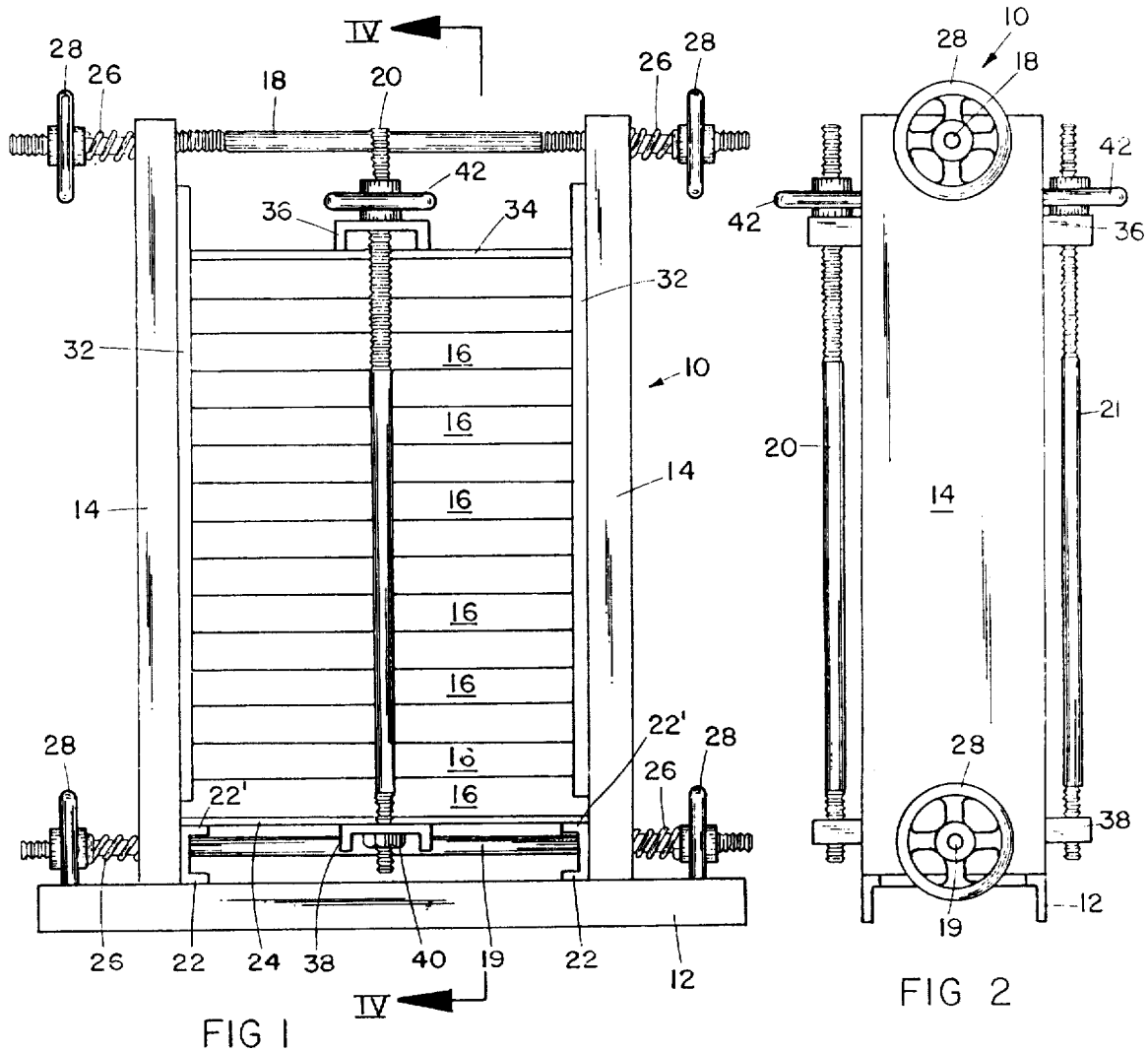
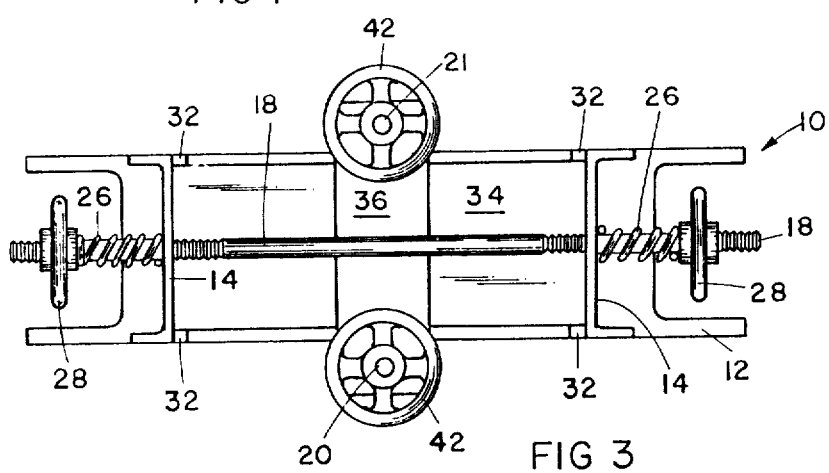

METHOD FOR FREEZE FORMING MEAT PRODUCTS

CROSS-REFERENCE TO RELATED APPLICATION

This is a division of application Ser. No. 431,678, filed Jan. 9, 1974, now U.S. Pat. No. 3,924,295.

BACKGROUND OF THE INVENTION

This invention relates generally to the production of "portion-controlled" meat products and more specifically, to the preparation of shaped meat products formed from various sized chunks of meat into a coherent block or loaf which may be sliced and subsequently prepared without breaking apart during cooking.

Various methods and apparatus have been developed in the prior art to cause the adherence of meat chunks to each other and in the development of molds so that the product can be formed into rolls or loaves as a convenience for subsequent cooking, slicing, and serving. Wilcox et al. U.S. Pat. No. 3,497,361 issued Feb. 24, 1970, entitled "METHOD OF PREPARING A REASSEMBLED MEAT PRODUCT" and Maas U.S. Pat. No. 3,076,713 issued Feb. 5, 1963, entitled "PROCESSING MEAT" are illustrative of the several prior art methods of processing meat to form a unitary body which can be forced into a container or casing to thereby assume a predetermined size and shape. If cooked, in the container, the product may generally be sliced without excessive breakage. However, slicing of the meat prior to cooking has not met with success, since the individual chunks of meat separate during subsequent cooking.

Siegel U.S. Pat. No. 3,290,721 issued Dec. 13, 1966, entitled "FOOD PRODUCT FREEZING DEVICE" discloses an apparatus for forming a food product in a container by freezing. Boneless beef cuts placed and frozen in an elongated tubular member upon expansion form an elongated, regularly shaped log or block convenient for subsequent cutting and packaging. Slidably mounted end caps in the tubular member allow expansion of the meat during freezing and maintain the ends of the log flat to minimize waste.

While these and other methods and apparatus disclosed in the prior art are generally satisfactory for the specific purpose for which they were designed, it has heretofore been impossible to provide a product generally completely free of voids within the mold and between the meat chunks and additionally, which is capable of withstanding subsequent cooking without loss of its geometric integrity. To overcome some of these problems, it is known to subject the meat chunks to high pressures within a container by means of hydraulically operated food presses commonly known to those skilled in the art. Typically such food presses include a forming die in which a ram is utilized to pack the product therein under extremely high pressure. Such presses are, however, expensive and include a multiplicity of specially designed dies, rams, and other components which must be maintained and serviced.

Grant U.S. Pat. No. 3,100,713 issued Aug. 13, 1963, and entitled "METHOD OF PREPARING MEAT" describes a basic method and apparatus for freeze forming individual chunks of meat into an integrated, unitary mass. Basically, Grant involves the steps of mechanically tenderizing meat or pieces of chicken by a pricking or punching process and then the subsequent step of placing the meat within a mold container and freezing whereby when the meat expands, the smooth outward configuration is returned to the food by its being forced against the surface of the mold. The resultant product is a substantially integrated loaf of meat having a smooth outer surface which may be sliced into various sized portions and then cooked and consumed in any desired manner. The Grant process, while providing an integral block of meat, is not controllable with respect to the pressures applied and the resultant density and regularity of the product. In portion-controlled processing operations, product regularity and density is of critical importance so that each and every slice of a given thickness will correspond extremely closely to the same weight and volume of meat.

SUMMARY OF THE INVENTION

The present invention improves upon the prior art in its provision of a relatively simple method and apparatus for forming shaped meat products from individual chunks of meat. The invention provides a shaped meat product capable of withstanding subsequent cooking without loss of its geometric integrity through the steps of mechanically treating chunks of unground fresh animal meat to cause a tacky exudate to form on the surface thereof. The mechanically treated meat is packed in a mold which is subsequently closed to entirely enclose the meat. The meat is then frozen to generate pressures within the mold solely by expansion resulting from the freezing within the mold cavity by maintaining the cavity at a constant volume to thereby force the meat to fill any voids within the mold and to press the meat chunks tightly together. The pressure exerted upon the meat in the mold is controlled by resiliently biased portions of the mold which allow the cavity of the mold to expand when a predetermined pressure has been obtained. After freezing, the meat is removed as a coherent body and may be subsequently sliced for packaging, distribution, preparation, and ultimate consumption.

The apparatus of the invention includes one or more mold members each having shaped cavities formed in the base thereof corresponding to the desired shape of the resultant product. At least one end of the mold is open having a detachably secured cover thereon. The base and cover are constructed to withstand high internal pressures. The cover element closing the opened end is movable lengthwise of the cavity and includes adjustable means resiliently resisting movement of the cover in response to the internal pressures generated within the mold. In a preferred embodiment, the adjustable means is a compression spring capable of exerting increasingly higher resistance to movement of the cover element as it moves outwardly in response to increases in pressures generated by freeze expansion of the meat within the mold.

The many objects and advantages of the present invention will be readily appreciated by those skilled in the art as the invention becomes better understood with reference to the following detailed description when considered in conjunction with the accompanying drawings.

BRIEF DESCRIPTION OF THE DRAWINGS

FIG. 1 is a front elevational view of the invention;
FIG. 2 is a side elevational view of the invention;
FIG. 3 is a top plan view of the invention illustrated in FIGS. 1 and 2;

DESCRIPTION OF THE PREFERRED EMBODIMENT

Figure 4:
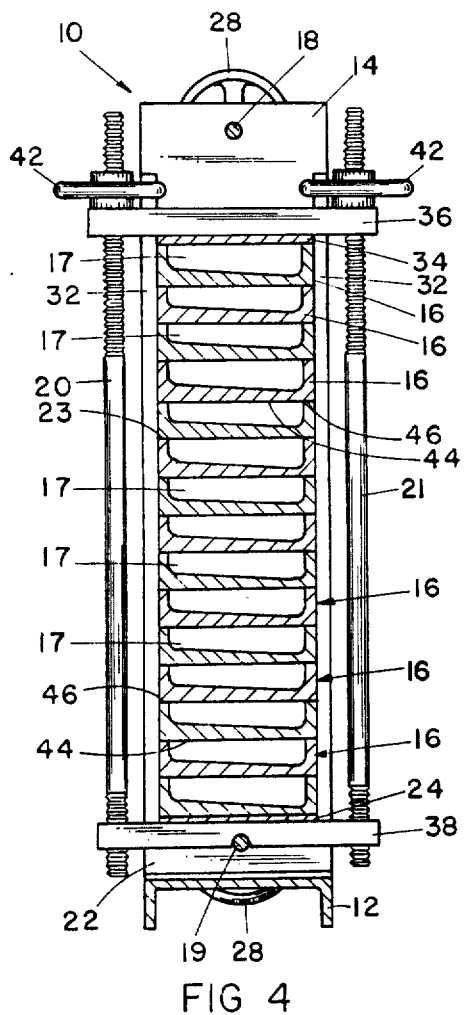
FIG. 4 is a cross-sectional view taken generally along the plane IV—IV of FIG. 1.

Referring now to the drawings, particularly FIGS. 1–4, the apparatus of the present invention includes a supportive framework generally designated by the numeral 10 including a base member 12 and a pair of upstanding vertical support and covering elements 14. A plurality of mold members 16 (FIG. 5) each having a shaped cavity 17 contained therein are stacked within the framework and retained therein by a pair of tie rods 18 and 19 extending horizontally across the top and bottom of the framework between upstanding vertical elements 14. Since these elements must uniformly resist the endwise pressure of the contents of all the molds, it is essential that they be structurally capable of doing this with minimal bowing or deflection between their ends. The lowermost mold 16 rests on a lower plate member 24 secured to a pair of spaced U-shaped channel members 22 extending transverse to base 12. Channels 22 are fixed to the base 12 as by welding and plate 24 is welded across an upper leg 22' of channels 22. The upper and lower tie rods 18 and 19, respectively, hold vertical support and cover elements 14 against the open ends 23 of molds 16 (FIG. 5) as the meat product contained within molds 16 expands upon freezing. During freezing, the meat expands against cover elements 14 tending to urge them outwardly away from the ends of molds 16. Cover elements 14 are held with respect to molds 16 by springs 26 and hand wheels 28. Tie rods 18 and 19 are threaded along their length such that the hand wheels and springs 26 may be tightened against the outside of the cover elements 14. Molds 16 are held in a vertically aligned position with respect to base 12 and cover elements 14 by means of elongated positioning channels 32 extending vertically along the length of cover element 14 on each side thereof. Positioning channels 32 may be formed of bar stock or the like suitably welded to the inner face of cover elements 14. The spacing between positioning channels 32 on each side of cover element 14 closely corresponds to the width of an individual mold 16.

Figure 5:
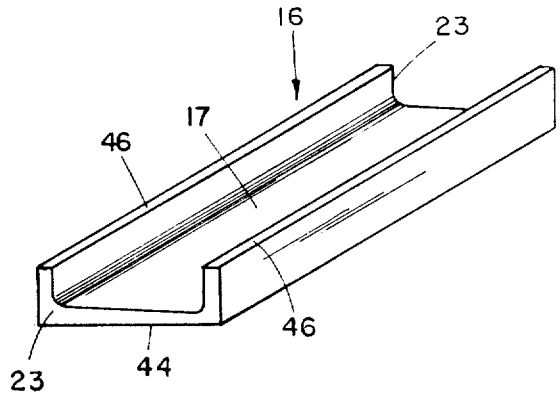
FIG. 5 is a perspective view of one of the mold members utilized in the invention.

Referring briefly to FIG. 5, mold 16 including its cavity 17 is seen to be generally elongated having open ends generally designated by the numeral 23. Cavity 17 may be of any desired shape or size so long as the material forming the side and bottom walls of the cavity are of sufficient thickness to preserve the structural integrity of the mold during freezing. Preferably, the mold is made of a thermally conductive material as for example, aluminum. The cavity may take any desired configuration representing, in cross section, the shape of the resultant end product. In the embodiment illustrated, the cavity is shaped so as to provide a product corresponding in shape and size to a meat cut commonly known as a "New York strip steak".

A plurality of molds 16 are stacked one upon the other within the framework (FIG. 4) such that the lowermost mold 16 rests on plate 24 and the bottom surface 44 of each mold rests on the top surface 46 of the sidewalls of a corresponding mold positioned therebelow. The uppermost mold 16 is closed by a cover plate 34 corresponding in width and length to the mold structure 16. The molds are retained and prevented from vertical movement during freezing by a pair of vertical tie bars 20 and 21, each being threaded along its length. At the lower end tie bars 20 and 21 are retained by means of nuts 40 (FIG. 1) fixed to a bottom lateral clamping channel 38. The uppermost end of the vertical tie bars 20 and 21 receive and secure an upper lateral clamping channel 36. Upper clamping channel 36 is provided with openings through which tie bars 20 and 21 are passed and a pair of hand wheels 42 are threaded on the tie bars. Hand wheels 42 are rotated downwardly into abutment with upper clamping channel 36 which in turn abuts and draws cover plate 34 toward lower plate 24 to thereby secure each of the individual molds 16 tightly to each other and to prevent vertical excursion therof during freezing. Each of the molds 16 is therefore seen to be closed at its top by the next adjacent upper mold and the top mold is closed by plate 34.

The preparation of the meat for utilization within the mold structure described hereinabove, is an important part of the method of the invention. A specific example illustrating the preparation and subsequent freeze forming of the meat into a shaped coherent meat product of the desired configuration is set forth as follows. Chunks of fresh, uncooked animal meat ranging in size from approximately ¼ ounce to 8 ounces are mechanically tenderized as by passing once through a cuber to flatten the meat cuts to approximately one inch thickness. While relatively small chunks of fresh meat are typically used in the process, larger chunks may be utilized. However, the process was developed primarily to provide an outlet for smaller irregular chunks of fresh animal meat. While the tenderization step is desirable to produce the best product, it is not essential for the production of an acceptable product.

The tenderized chunks of meat are then brought to a temperature in the range of 35°–40° F. and placed in a meat tumbling machine. For a batch of approximately one hundred pounds of meat chunks, a conventional Leland Model 250 Tumbler has proven to be most effectively utilized although any other tumbling machine could be utilized or, if desired, the meat could be worked manually. To the one hundred pounds of meat, approximately six ounces of hydrolyzed vegetable protein (a flavor enhancer) and six pounds of water are added. This mixture is then tumbled for approximately four minutes to cause elongation of the meat fibers and to completely blend the product. After four minutes of tumbling, eight ounces of sodium tripolyphosphate is added to prevent oxidation and retard freezer burn. The sodium tripolyphosphate, preferably in powder form, is tumbled for approximately two additional minutes to coat the meat evenly for freezer protection. During tumbling, it is noted that with mechanical working, the meat becomes soft and pliable and an appreciable amount of a tacky exudate forms on its surfaces. This tacky exudate, it is theorized, assists in causing adhesion of the meat chunks to each other. This process may be practiced without hydrolized vegetable protein or tripolyphosphate since only the flavor, not the structural integrity of the product will be affected.

It has been found that a satisfactory product can be made if the only addition is monosodium glutamate at the rate of 4 oz. per 100 lbs. of meat. When the metallic salts are not used the tacky exudate can be formed by lengthening the tumbling cycle or by storage under cool conditions or a combination of both.

Depending upon the moisture content of the meat, the amount of added water could be reduced or in some cases, eliminated entirely.

Finally, the meat is removed from the tumbler and packed within molds 16. Preferably, a sheet of suitable liner such as polyurethane is placed in the mold cavity 17 prior to packing the meat. The meat is packed within molds 16 to completely fill cavity 17 and the polyurethane is closed over the top and ends thereof. Care is taken in packing the mold to eliminate as many voids as possible. Small or minute voids will remain and will be eliminated subsequently in the process. The molds 16 are preferably at a temperature of approximately 35°-40° during packing.

It is important that the mold not be prechilled below freezing temperature. Preferably the mold is maintained at a temperature above freezing and at a temperature corresponding to the temperature at which the meat is normally refrigerated. Significantly, it has been experimentally noted that if the mold is prechilled below freezing prior to packing, voids will appear in the completed product. It is believed that these voids appear because when the meat is packed in a chilled mold the freeze-expansion process proceeds too rapidly, with substantial freezing taking place prior to the time the mold is completely filled. This is thought to be particularly true as to the areas of the meat in contact with the sidewalls of the mold. As a result, the gradual and progressive expansion and pressure increase is not attained to generate the type of internal pressures necessary to force the individual meat chunks into positive surface to surface contact with all adjacent meat chunks.

The molds, assembled as shown in FIGS. 1 and 4, are then locked in place and the entire assembly subjected to a slow freeze until solid at temperatures of from approximately 0° to −15° F. This freezing was accomplished in about eight hours. While it is believed that the freezing time can be reduced, it is considered important that the freezing process proceed gradually. When locking the molds in the framework, springs 26 are preferably pretensioned equally so as to exert an equal and constant force on cover elements 14 at the ends of each of the several molds 16. Hand wheels 42 associated with vertical tie bars 20 and 21 are tightened sufficiently to prevent any vertical excursion of the molds and covers 34 during freezing.

As the meat chunks freeze and expand, pressure constantly increases on the meat within the mold, forcing the meat chunks tightly together. In so doing it reshapes them, eliminates the voids between them and presses them together with sufficient force that the lines of demarkation between the individual pieces are all but eliminated and are generally visible only upon close inspection. Thus, the meat is made to simulate a single piece of meat of the size and shape of the mold.

In an experiment conducted to determine the pressure developed within the molds during the freezing process, ten molds were each filled with 10 pounds of meat chunks. The packing was so done as to eliminate all large, visible voids. The cross-sectional area of the cavity of each mold was determined to be 12.785 square inches. The molds were stacked one upon another between cover elements 14 as illustrated in FIG. 1. The four springs 26 were tightened to an identical initial deflection of 0.30 of an inch. The springs 26 used were 3.5 inches long, Danley highpressure mold springs of accurate length and of predetermined value for each increment of deflection. The manufacturer's rating of each spring was 156 pounds for each 0.10 inch increment of deflection, this value remaining basically constant throughout the full range of deflection.

In closing the molds no or only slight squeezing pressure was applied to the meat. The tensioning of the spring 26 did not increase this pressure since the rigid mold body was in bearing against the cover elements 14. Thus, at the initiation of the freezing cycle, the meat in the mold, while firmly packed, was not under elevated pressure.

The product was then subjected to freezing temperatures in the range of 0° to −15° F. until the product was completely frozen. The total deflection of each spring was then again measured. There were slight differences in the amount of deflection of each of the springs and it was observed that greater deflection occurred at the bottom springs than at the top springs. Averaging the deflection of all four springs it was determined that the average total deflection of each spring was 0.505 of an inch, including the initial 0.30 deflection applied to it.

Since the pressure acting at each end of each mold is the same, it is necessary to consider only the values at one end of the molds. Computing the total pressure at one end of the molds gives a figure of 1575.6 pounds (156 × 5.05 × 2). Since the total effective mold cavity area exposed to the end cover was 127.85 square inches, the effective pressure in the molds was 12.32 lbs./square inch. It is recognized that the actual pressure is higher than this value since no allowance has been made for such factors as frictional resistence. The contraction resulting from lowered temperatures will partially compensate for this.

Preferably, the preliminary tensioning of springs 26 will be established to permit only minimal travel or excursion of cover element 14 to minimize waste of the resultant meat product. However, it has been found that some endwise expansion is desirable. This assures that the threshold pressure established by the pretensioned springs 26 is reached at some point during the process. With these springs deflected 0.30 of an inch this threshhold pressure is approximately 7.32 lbs. sq. in.

Experimentation has shown that pressures less than that which were measured in the above experiment will produce a satisfactory product. However, the lower threshhold of operative pressure has not been determined. It is also believed that higher pressures will work but are unnecessary to produce a completely satisfactory product. While the pressure exerted on the vertical elements 14 can be varied by controlling the pretension on spring 26, by varying the spring size, or by varying the quantity of meat chunks placed in the cavity, the pressures disclosed herein have been found to be quite successful in the production of formed elongated meat products in a plurality of molds in the apparatus shown.

After the meat is frozen solid, hand wheels 28 and 42 are removed together with the associated tie rods 18 and 19 and tie bars 20 and 21 and the individually molded loaves or logs of meat can be conveniently removed from the individual molds. The integral, coherent loaf of meat produced may then be utilized in the production of portion-controlled individual servings. Since each mold has had an equal amount of meat placed therein, and since the expansion of the meat in each mold is approximately equal and all voids within the mold have been eliminated, the resultant loaves are therefore, each equal in size and may be sliced into any number of individual slices each of which, if of the same thickness, is of approximately the same weight. The slices are then merchandised and prepared in a conventional manner. Upon preparation as by broiling, roasting or frying, the individual slices retain their geometric integrity and do not break apart.

Alternately, the entire loaf may be cooked slowly at temperatures ranging from about 130° to 150° F. to a generally medium rare to medium state and cut into relatively thin slices without breaking apart and separation of the integrally united meat chunks.

The loaves can be thawed and sliced into thin slices of at least ⅛ inch thickness and prepared as by frying without loss of cohesiveness. Similarly, thin, frozen slices may be grilled without separation and breakage.

Figure 7:
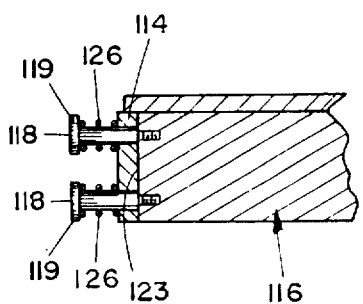
FIG. 7 is a fragmentary cross-sectional view of the mold illustrated in FIG. 6.
Figure 6:
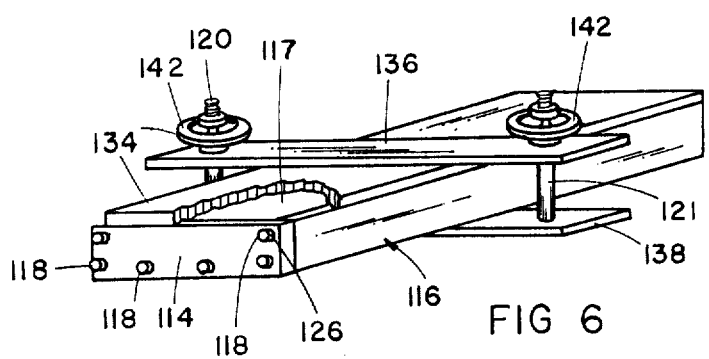
FIG. 6 is a perspective view of a slightly modified individual mold member.

A slightly modified and simplified mold assembly utilized in the practice of the invention is shown in FIGS. 6 and 7 wherein, for example for reasons of economy or for small production runs, it is desired to produce only one coherent loaf of meat chunks which may be cut into a desired number of slices. In this embodiment, like parts are identified with like reference numerals prefixed by the number 100. Basically, the mold 116 has an essentially identical configuration to that previously described having a formed cavity 117 therein. A cover member 134 corresponding approximately to the width and length of the mold is held on its upper surface 123 by means of a clamp. The clamp includes a top plate 136 and a bottom plate 138 held together in clamping relationship by a pair of vertical tie bars 120 and 121. Upper clamp 136 is secured with respect to the cover 134 and the bottom of the mold by a pair of hand wheels 142. The end of the mold cavity are closed by at least one end cover or cap 114 retained thereon by a plurality of springs 126 and shoulder screws 118. It will be recognized that the cover or cap 114 is the functional equivalent cover elements 32. Shoulder screws 118 are provided with enlarged heads 119 which abut springs 126 to bias the springs against end cover 114. The shoulder screws are threadably received in mold 116 and are therefore adjustably secured thereto.

Springs 126 are selected to have predetermined compression qualities and are pretensioned upon assembly by turning shoulder screw 118 a predetermined amount to thereby apply a predetermined biasing force against the meat within the container with expansion during freezing. The use and operation of the mold disclosed in FIGS. 6 and 7 is substantially identical to that in the embodiment previously described. Preliminary processing of the meat including the tenderizing, tumbling, and packing within the mold are identical. The resultant product conforms to the shape of the mold cavity and may be sliced and otherwise prepared and packaged as previously described.

THEORY OF OPERATION

While the exact physical phenomenon occurring within the mold during the freeze forming process is not totally understood, it is theorized that the exudate formed on the surfaces of the meat during the preliminary tumbling operation is partially forced back into the meat by the pressure generated during freezing and acts as a bonding agent. In addition, with expansion the voids in the loaf are eliminated as the individual meat chunks are forced into a positive surface to surface contact to integrate the individual pieces intertwining the fibers of the meat together with the bonding agent formed by the exudate resulting in a product having a uniform texture.

Pressures generated in the mold and on and in the meat are unlike the pressures generated by the hydraulic ram and dies of the prior art systems. In the prior art, the force exerted at the open or ram end of the die is at maximum while pressures generated along the length of the die as the ram moves inwardly on the meat are reduced by frictional and other losses such that the meat in the die at the end opposite the ram is substantially lower. Accordingly, if pressures are not sufficiently high at one end, the resultant product will have voids and gaps therein thereby not providing a product of uniform cross section and capable of withstanding cutting and cooking without loss of its geometric integrity. If the pressure is increased at the ram to cause sufficient pressure on the meat at the opposite end, the meat at the high pressure end suffers from severe abrasion and tends to become mushy. The texture is not uniform and the resultant product is generally unsatisfactory. In addition, it has been found that the product cannot withstand subsequent slicing and cooking without loss of its geometric integrity.

In the present invention when the mold and the meat contained therein are subjected to slow freezing, it is believed that the meat begins to freeze and expand at the surface areas nearest to the exposed surfaces of the mold. As the freezing continues the meat freezes progressively toward the center of the mass also expanding the meat with increasing pressure allowing the chunks to move into positive surface to surface contact with adjacent meat chunks thereby eliminating all voids between chunks and forming an integral product having a uniform texture throughout. The gradual increase in pressure permits the meats to creep within the mold, thus giving the individual meat chunks time to accurately conform to the shape of the space within which they are confined.

In experimental tests it has been found that if the cover elements on the mold are not so retained under at least low pressure little or no positive increase in pressure occurs and the resulting product has voids and lacks satisfactory cohesiveness. Experimentation has also established that if the molds are prechilled below or near the freezing point prior to packing an unacceptable product results because it has voids and lacks the necessary degree of cohesiveness. This experimentation points to the importance of slow freezing and indicates that the gradual, progressive increase in pressure is essential to the process. It has also been established that if large voids are left in the mold packing process, these will not fill and a product lacking the necessary cohesiveness or geometric stability to withstand subsequent cooking with result. The existence of such voids provides a pressure relief means, preventing the freezing process from developing the necessary elevated pressures to produce an acceptable product.

It is also believed that initiating the freezing process while the meat is under little or no pressure is important. It is thought that the initial absence of compressive forces facilitates creep or migration of the meat. This permits the meat to fill in even very small voids and affords the individual chunks an opportunity to reshape themselves to fill completely the space they occupy. This permits the formation of a product of uniform density and adequate cohesiveness.

Accordingly, it is very important to maintain at least a minimum pressure at the ends of the mold. The molds must be packed as tightly as possible but at substantially zero pressure on the ends and the temperature of the meat and the mold during packing must be at least above a freezing temperature. It is also believed important that the biasing force increase as the meat expands since this appears to contribute significantly to the production of an integral coherent product of uniform density. It is a known physical phenomenon that as pressure increases, the freezing point of water decreases. The slow freeze occurring in the practice of the invention is therefore not only a function of temperature, but also of the biasing force applied at the ends of the mold.

As the freeze process continues, the surfaces of the meat in abutment with each other are forced together forming the integral mass. It is believed that the exudate formed during the preliminary tumbling of the meat is largely forced back into the elongated fibers of the meat chunks and serves as a bonding agent causing the surfaces of the meat to intertwine and form a cohesive mass. The mold and the meat contained therein are subjected to the slow freezing temperatures until they are frozen throughout and the volume of the mold cavity is permitted to increase as the internal pressures produced in the meat and within the cavity exceed the predetermined resistance values established by the pretensioning of the springs. As the pressures increase beyond this threshold point the meat is forced outwardly along the length of the mold to expand the ends thereof against the biasing force. Finally, the pressure is released and the product is removed from the mold where it may be cut and prepared in any desired conventional manner.

The invention can be put to numerous uses; however, primarily chunks of whole unground, uncooked meat are most economically utilized by uniting those chunks into a solid integral coherent body of meat of a desired shape. After processing, and when the meat is removed from the mold and cut into individual slices, the chunks do not separate with further preparation such as broiling. The texture is the same or very similar to a conventional cut of meat. It is an aesthetically appealing meat product having the appearance and marbling of a high priced meat cut. The invention is applicable generally to whole unground meat chunks from various animals —beef, pork, veal, mutton, venison, or the like. The frozen product, even after slicing, may be held under refrigeration for long periods of time before being cooked and yet the product does not break apart on cooking. It is significant that the slices prepared in accordance with the invention retain their shape even after defrosting. Upon frying, roasting, broiling, and grilling, the meat thus formed is found to retain its shape and the slices remain intact without separation.

In the production of some meat cuts as, for example, the New York strip steak, it is often desirable to provide a thin layer or strip of fat about the edges thereof. Toward this end, such cuts have been successfully freeze formed through the use of the apparatus of the invention by lining the bottom and sides of the mold cavity with a thin layer of fat prior to placing the meat therein. Upon freezing, the meat chunks adhere to each other and also to the fat layer. Upon slicing and subsequent cooking, the fat strip remains thereon as in the conventional cut of meat. In an alternate approach, the first-formed product after freezing is transferred, after slight thawing, to a second, slightly larger mold in which a thin layer of fat is provided. Upon subsequent freezing and expansion, the fat adheres to the first-formed product and the resulting shaped product may be cut and prepared as previously described.

The product produced by the method and apparatus of the invention provides a great number of advantages to the meat processor. Primarily, the invention enables the processor to find a more profitable outlet for small cuts of meat resulting from trim and small pieces obtained during portion-controlled cutting operations on larger cuts. The small pieces utilized in the practice of this invention previously were sold at reduced prices or used in the production of ground beef or hamburger. These pieces may now be utilized to manufacture an assembled meat product having the appearance of a natural grain and marbling of higher priced cuts of meat. Thus, these meats are upgraded both in value and in general acceptability. Cost savings are realized by the process and ultimately the savings are passed on to the consumer.

While the apparatus of the invention has been described as utilizing spring means to control the pressure at the ends of the molds, hydraulic or pneumatic pressure means may also be utilized with equal efficiency. In the case of a hydraulic restraint system, pressure actuators or the like are positioned to bear against and restrain the upright vertical end covers against the ends of the molds. Suitable low temperature fluids are contained therein and applied through a pressure release valve adapted to start release of the fluid only after having reached a predetermined pressure. A surge chamber or the like capable of creating increasing pressure when the fluid release has been initiated may also be utilized to thereby allow the application of increasing forces as the meat expands during freezing.

Although a preferred embodiment of the present invention has been described and illustrated in detail, those skilled in the art will readily appreciate that various modifications can be made without departing from the spirit of the present invention. Accordingly, the scope of the invention is to be limited only by the appended claims.

The embodiments of the invention in which an exclusive property or privilege is claimed are defined as follows:

1. The method of forming a shaped meat product capable of withstanding subsequent cooking without loss of geometric integrity comprising the steps of: providing chunks of unground fresh meat; forming a tacky exudate on the surface of the meat without further comminution of the same; packing the meat in a mold to fill it; closing the mold to entirely enclose the meat therein while applying little or no compressive forces to it; gradually expanding the meat in the closed mold by slowly subjecting the mold and the meat contained therein to subfreezing temperatures to generate elevated pressures solely by expansion resulting from freezing and by maintaining a constant volume in the mold allowing the pressure exerted upon the meat to increase to that which is necessary to force the meat to fill any voids within the mold and to press the meat chunks tightly together; thereafter continuing to freeze the meat while maintaining the pressure constant by controlled expansion of the mold volume until the entire contents of the mold is frozen, removing the frozen meat as an integrated body from the mold.

2. The method of forming a shaped meat product as described in claim 1 wherein the controlled pressure is in the range of 1–100 psi.

3. The method of forming a shaped meat product as described in claim 1 wherein the controlled pressure is in the range of 1–50 psi.

4. The method of forming a shaped meat product as described in claim 1 wherein the controlled pressure is in the range of about 5–15 psi.

5. The method of forming a shaped meat product capable of withstanding subsequent cooking without loss of geometric integrity comprising the steps of: providing a quantity of separate particles of fresh animal meat; forming a tacky exudate on the surface of the meat without further comminution of the same; packing the meat in a cavity of a mold; closing the mold to entirely enclose meat therein; gradually expanding the meat in the closed mold by slow freezing to generate high pressures solely by expansion resulting from freezing within the mold cavity by maintaining the cavity at a constant volume to force the meat to fill any voids within the mold and to press the meat chunks tightly together; controlling the pressure exerted upon the meat in the mold by expanding the cavity of the mold when a predetermined pressure has been attained and removing the frozen meat from the mold.

6. The method of forming a shaped meat product as described in claim 5 wherein the controlled pressure is in the range of 1–100 psi.

7. The method of forming a shaped meat product as described in claim 5 wherein the controlled pressure is in the range of 1–50 psi.

8. The method described in claim 5 in which the mold cavity is elongated, maintaining the cross-sectional area of the mold constant at all times and effecting volumetric expansion thereof endwise only to form a product of uniform cross section.

9. The method of forming an integrated shaped meat product of uniform cross section and capable of withstanding subsequent cutting and cooking without loss of geometric integrity comprising the steps of providing chunks of raw meat; forming a tacky exudate on the surface of the meat; providing a mold having a shaped cavity, packing the meat chunks into the cavity of the mold, closing the mold; slowly expanding the meat in the mold by subjecting the mold and the meat contained therein to subfreezing temperatures, maintaining the volume of the cavity constant to increase the pressure to which the meat therein is subjected into a range sufficient to eliminate any voids within the mold and to force the individual meat chunks into positive surface-to-surface contact with all adjacent meat chunks to form a voidless integral product and continuing to subject said product to subfreezing temperatures until it is frozen throughout while permitting the volume of the mold cavity to increase after the voidless integral product has been formed, releasing the pressure and removing the frozen product from the mold.

10. The method described in claim 9 in which the range of pressure sufficient to form the product is 1–500 psi.

11. The method described in claim 9 in which the range of pressure sufficient to form the product is 1–100 psi.

12. The method described in claim 9 in which the range of pressure sufficient to form the product is 1–50 psi.

13. The method described in claim 9 in which the range of pressure sufficient to form the product is 1–25 psi.

14. The method described in claim 9 in which the mold cavity is elongated, maintaining the cross-sectional area of the mold constant at all times and effecting volumetric expansion thereof endwise only to form a product of uniform cross section.

* * * * *